US008924497B2

(12) United States Patent
Sheridan et al.

(10) Patent No.: US 8,924,497 B2
(45) Date of Patent: Dec. 30, 2014

(54) MANAGING DELIVERY OF ELECTRONIC MESSAGES

(75) Inventors: William A. Sheridan, Chandler, AZ (US); Corey W. Wick, Dallas, TX (US); Marie Risov, Bloomfield, MI (US); Kas Kasravi, West Bloomfield, MI (US); Stephen F. Mayes, Troy, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 395 days.

(21) Appl. No.: 11/941,737

(22) Filed: Nov. 16, 2007

(65) Prior Publication Data
US 2009/0132662 A1 May 21, 2009

(51) Int. Cl.
*G06F 15/16* (2006.01)
*H04L 12/58* (2006.01)
*G06Q 10/10* (2012.01)
*G06F 13/00* (2006.01)
*G06F 3/00* (2006.01)
*H04N 5/445* (2011.01)

(52) U.S. Cl.
CPC ............ *H04L 12/5855* (2013.01); *H04L 51/26* (2013.01); *G06Q 10/107* (2013.01); *H04L 51/14* (2013.01)
USPC .............. 709/207; 709/203; 709/206; 725/38

(58) Field of Classification Search
USPC .................................................. 709/204–207
See application file for complete search history.

(56) References Cited

U.S. PATENT DOCUMENTS

| | | | |
|---|---|---|---|
| 6,654,790 B2 | 11/2003 | Ogle et al. | 709/206 |
| 6,707,890 B1 | 3/2004 | Gao et al. | 379/88.12 |
| 6,711,154 B1 | 3/2004 | O'Neal | 370/352 |
| 6,772,196 B1 | 8/2004 | Kirsch et al. | 709/206 |
| 7,054,906 B2 | 5/2006 | Levosky | 709/206 |
| 2002/0120697 A1* | 8/2002 | Generous et al. | 709/206 |
| 2002/0157094 A1* | 10/2002 | Saito et al. | 725/38 |
| 2003/0046421 A1* | 3/2003 | Horvitz et al. | 709/238 |
| 2004/0154022 A1 | 8/2004 | Boss et al. | 719/310 |
| 2005/0080864 A1 | 4/2005 | Daniell | 709/206 |
| 2005/0149622 A1 | 7/2005 | Kirkland et al. | 709/207 |
| 2005/0171955 A1 | 8/2005 | Hull et al. | 707/10 |
| 2006/0168037 A1 | 7/2006 | Audu et al. | 709/206 |
| 2006/0168060 A1 | 7/2006 | Briand et al. | 709/206 |
| 2008/0132211 A1* | 6/2008 | Keshavarzian et al. | 455/414.1 |
| 2008/0172466 A1* | 7/2008 | Tonegawa et al. | 709/206 |

OTHER PUBLICATIONS

Microsoft Office Labs, Current Projects: www.officelabs.com, (3 pgs.).
Microsoft Office Labs, Project: Email Prioritizer, obtained from www.officelabs.com, (8 pgs.).

(Continued)

*Primary Examiner* — Evans Desrosiers

(57) ABSTRACT

In certain embodiments, a method for managing delivery of electronic messages includes receiving an electronic message, the electronic message having an intended recipient, and analyzing the electronic message to determine a priority for the electronic message. The method further includes determining, based on the determined priority for the electronic message; whether to deliver the electronic message to the intended recipient at the current time. If it is determined, based on the determined priority for the electronic message, that the electronic message should be delivered to the intended recipient at the current time, delivery of the electronic message to the intended recipient is initiated.

20 Claims, 4 Drawing Sheets

(56) References Cited

OTHER PUBLICATIONS

Miller, George A., "The Magical Number Seven, Pluse or Minus Two," *Psychological Review*, 63, 81-97; available at http://psychclassics.yorku.ca/Miller/ (16 pgs.), 1956.

Davenport, Thomas H. and John C. Beck, The Attention Economy: Understanding the New Currency of Business, Harvard Business School Publishing, 2001 (262 pgs.).

CNN.com; "Emails 'hurt IQ more than pot,'" Apr. 22, 2005, http://www.cnn.com/2005/WORLD/europe/04/22/text.iq/index.html (2 pgs.).

Lessig, Lawrence, "Declare email bankruptcy," *Wired*, 14.08: Aug. 2006, http://www.wired.com/wired/archive/14.08/howtodesk.html (2 pgs.).

Robbins, Stever, "Tips for Mastering E-mail Overload," Working Knowledge for Business Leaders, Harvard Business School Press, Oct. 25, 2004, http://hbswk.hbs.edu/archive/4438.html (6 pgs.).

Overcomeemail overload.com, http://www.overcomeemailoverload.com/ (2 pgs.).

Bruck, Bill, Taming the Information Tsumami, ISBN 0735614342 (369 pgs.), Jan. 2002.

\* cited by examiner

MANAGING DELIVERY OF ELECTRONIC MESSAGES

TECHNICAL FIELD OF THE INVENTION

The present invention relates generally to electronic messages, and more particularly to managing delivery of electronic messages.

BACKGROUND

The typical office worker in a modern work environment is routinely overloaded with information, incoming and outgoing electronic messages, and a variety of work responsibilities scattered among numerous activities. The cognitive demands placed on these individuals are often so great that even the most organized individual finds it difficult to perform up to his or her full potential. One of the leading contributors to sub-optimal performance, whether in a work environment or other environment, is distractions created by electronic messages, such as emails, text messages, instant messages (IMs), telephone calls, and other electronic messages.

The research in this area reveals significant problems. For example, clinical research conducted by Dr. Glenn Wilson, Kings College London University, found that "the IQ of people trying to juggle messages and work fell by ten points—the equivalent to missing a whole night's sleep and more than double the 4-point fall seen after smoking marijuana." As another example, Thomas Davenport and John Beck in their book "The Attention Economy" state that "the average U.S. office worker is spending almost half the day in message-related activity. This estimate is consistent with unpublished studies from Ferris Research and Lotus Research on email usage, which found that average white collar workers can typically spend two hours per day on email alone." As another example, in Harvard Business School's Working Knowledge, Steven Robbins calculates that an employee who actually responds to 100 emails each day (at three minutes per response) would need five hours to complete the task.

Many electronic messages have value, but this value may come at a cost to the individual and the organization. For example, when people go off-task to respond to electronic messages, they take time to recall where they were and to reengage, which may cause them to lose momentum after a meeting or phone call and may adversely affect their effective intelligence.

SUMMARY

According to the present invention, disadvantages and problems associated with previous techniques for managing delivery of electronic messages may be reduced or eliminated.

In certain embodiments, a method for managing delivery of electronic messages includes receiving an electronic message, the electronic message having an intended recipient, and analyzing the electronic message to determine a priority for the electronic message. The method further includes determining, based on the determined priority for the electronic message; whether to deliver the electronic message to the intended recipient at the current time. If it is determined, based on the determined priority for the electronic message, that the electronic message should be delivered to the intended recipient at the current time, delivery of the electronic message to the intended recipient is initiated.

Particular embodiments of the present invention may provide one or more technical advantages. In certain embodiments, the present invention reduces the cognitive overload caused by excessive electronic messages. This may reduce office worker distractions due to excessive electronic messages. In certain embodiments, the flow of interruptions to a user may be controlled, enabling the user to control distractions by prioritizing and controlling incoming electronic messages. The present invention may prioritize electronic messages and content so that the volume of information the user must process is reduced to a manageable volume.

In certain embodiments, using multiple heuristics may allow electronic messages to be prioritized based on multiple factors. The present invention may allow preferred or otherwise important electronic messages to be processed and delivered first. In certain embodiments, the accuracy of the present invention is improved based on feedback from recipients of electronic messages.

In certain embodiments, the present invention provides a single, integrated, and context-sensitive solution for managing distractions associated with electronic messages. In certain embodiments, the present invention provides one or more of the following: (1) device independent messaging notification; (2) electronic mail filtering system; (3) enabling wireless messaging systems to use alternative message delivery mechanisms; (4) filtering IMs by context; (5) handling presence messages; (6) information filtering using measures of affinity of a relationship; (7) IM priority filtering based on content and hierarchical schemes; (8) processing rules for digital messages; (9) controlling and organizing email; and (10) voicemail notification. In certain embodiments, the present invention may enable rapid and reliable emergency communications while maintaining control of spurious or lower-priority requests.

In contrast to certain previous and existing solutions for managing delivery of electronic messages, certain embodiments of the present invention provide a context-sensitive, integrated solution that spans multiple forms of electronic communication. In contrast to certain previous and existing solutions that require users to manually review electronic messages from individuals on a "permission list" to determine if the messages are important enough to require immediate attention, certain embodiments of the present invention analyze electronic messages based on a set of heuristics that provide a context-sensitive analysis of the electronic messages rather than a simple permission list. Certain previous and existing solutions merely provide features that allow a user to simply turn off a messaging device or otherwise implement a "do not disturb" feature. However, these features may cause an intended recipient to miss electronic messages that the recipient is willing to accept at a given time. In contrast, certain embodiments of the present invention improve a user's ability to receive certain appropriate electronic communications at a given time, while delaying (or blocking) other electronic communications until a later time.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
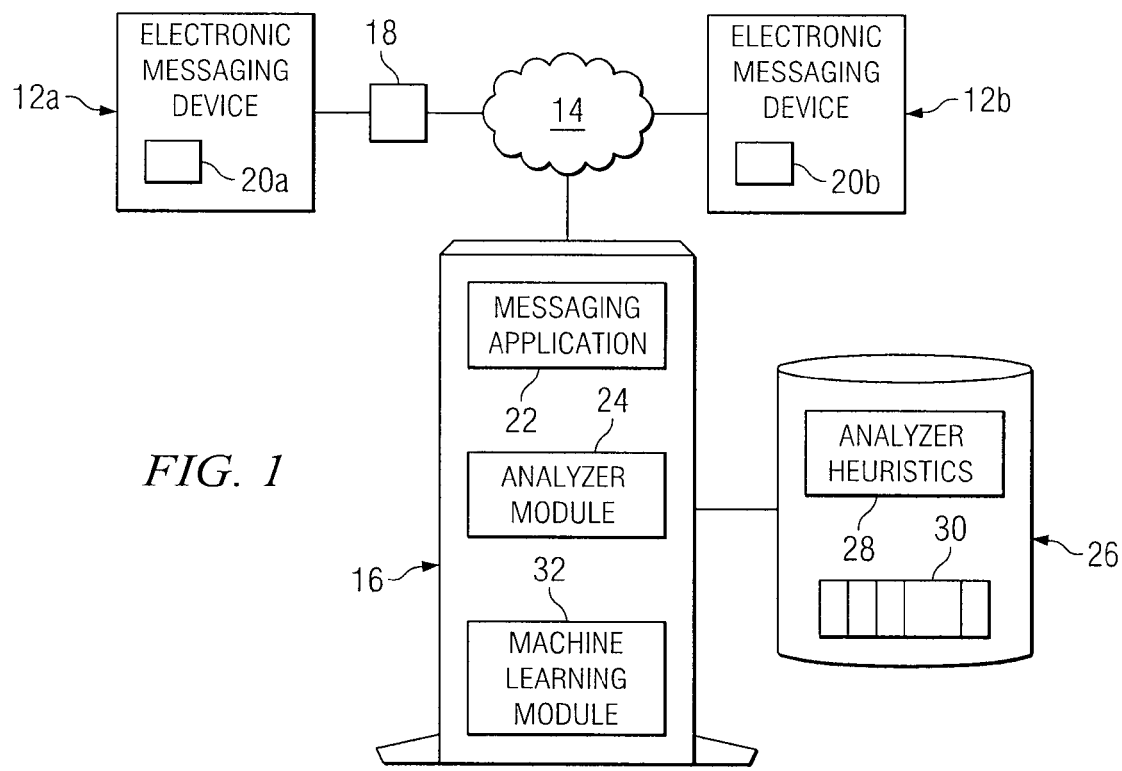
FIG. 1 illustrates an example system for managing delivery of electronic messages, according to certain embodiments of the present invention.

FIG. 1 illustrates an example system 10 for managing delivery of electronic messages, according to certain embodiments of the present invention. Although a particular embodiment of system 10 is illustrated and primarily described, the present invention contemplates any suitable embodiment of system 10. System 10 includes one or more electronic messaging devices 12, one or more networks 14, and a server system 16. In general, certain embodiments of system 10 are operable to analyze an electronic message prior to delivering the electronic message to its intended recipient, to assign a priority to the electronic message based on the analysis, and to determine, based on the assigned priority, whether the electronic message should be delivered to its intended recipient at the current time or instead be placed in a holding pattern for later analysis and/or delivery. In certain embodiments, managing delivery of electronic messages according to the present invention may reduce the cognitive overload caused by excessive electronic messages.

Electronic messaging devices 12 may each be any suitable type of electronic messaging devices. For example, electronic messaging devices 12 may include one or more of: a conventional computer (e.g., a desktop computer or a laptop computer); a BLACKBERRY, TREO, or other personal digital assistant (PDA) device; a cellular telephone; a VoIP device; or any other suitable processing device that is capable of generating and/or receiving electronic messages. Although a particular number of electronic messaging devices 12 are illustrated in FIG. 1, the present invention contemplates system 10 including any suitable number of electronic messaging devices 12. For example purposes only, in the particular example described with reference to FIG. 1, electronic messaging device 12a will be described as the sending electronic messaging device (the electronic messaging device that sends an electronic message), and electronic messaging device 12b will be described as the intended recipient electronic messaging device (the electronic messaging device that receives an electronic message). The type of electronic messaging device 12a may differ from the type of electronic messaging device 12b, if appropriate.

Electronic messaging device 12a may communicate one or more electronic messages 18, which for simplicity will be referred to primarily in the singular for the remainder of this description. Electronic message 18 may include any suitable type of message that may be communicated through an electronic medium from any suitable type of electronic messaging device 12. In certain embodiments, electronic message 18 may include one or more of an email, a voice-over-Internet-Protocol (VoIP) call, an IM, or any other suitable type of electronic message. Electronic message 18 may include one or more properties. In certain embodiments, the properties of certain electronic messages include one or more of Header, From, To, CC, BCC, Date, Subject, Body, and Path. Each electronic message may have a sender and a recipient (also referred to as an intended recipient). Certain electronic messages may have a number of intended recipients.

The present invention contemplates system 10 including any suitable number and types of electronic message processing systems. Example electronic message processing systems may include MICROSOFT OUTLOOK, MICROSOFT OUTLOOK EXPRESS, AOL MAIL, EUDORA, YAHOO MAIL, GMAIL, FASTMAIL, IOGYMAIL, NETZERO MAIL, MSN HOTMAIL, BLACKBERRY, JABBER, and VONAGE. Depending on the system, electronic computing devices 12 may include a suitable interface for interfacing with the messaging system.

Each electronic messaging device 12 may include an electronic messaging application 20. Electronic messaging devices 12 may each include any suitable number and types of electronic messaging applications 20. Electronic messaging application 20 is operable to facilitate the generation and communication (e.g., the sending and receiving) of electronic messages 18. Electronic messaging application 20 may include any suitable combination of software, firmware, and hardware. As just a few examples, electronic messaging application 20 may include an email application (e.g., MICROSOFT OUTLOOK), a text-messaging application (e.g., JABBER), a VoIP messaging application (e.g., VONAGE), or any other suitable type of electronic messaging application 20. Among other functions, electronic messaging application 20 may provide an interface for a user of electronic messaging device 12 to send and/or receive electronic messages 18. The electronic messaging application 20a of electronic messaging device 20a may or may not be the same as the electronic messaging application 20b of electronic messaging device 20b. Although electronic messages 18 are primarily described as being generated by a user interacting with electronic messaging application 20, the present invention contemplates electronic messaging application 20 (or another suitable application) automatically generating electronic message 18.

System 10 includes one or more networks 14. Networks 14 may include, in any suitable combination, one or more local area networks (LANs), metropolitan area networks (MANs), wide area networks (WANs), radio access networks (RANs), a global computer network such as the Internet, or any other wireline, optical, wireless, or other links. Networks 14 may communicate, for example, IP packets, Frame Relay frames, or Asynchronous Transfer Mode (ATM) cells to communicate voice, video, data, and other suitable information between network addresses. The present invention contemplates any suitable intervening servers (e.g., one or more web servers) or other communication equipment (e.g., routers, switches, etc.) between electronic messaging devices 12 and server system 16.

Server system 16 may include one or more electronic computing devices operable to receive, transmit, process, and store data associated with system 10. For example, server system 16 may include one or more general-purpose PCs, Macintoshes, workstations, Unix-based computers, server computers, one or more server pools, or any other suitable devices. In one embodiment, server system 16 includes a web server. In short, server system 16 may include any suitable combination of software, firmware, and hardware. In certain embodiments, server system 16 comprises an email server, which may or may not be a part of a larger server system. Although a single server system 16 is illustrated, the present invention contemplates system 10 including any suitable number of server systems 16. Moreover, although referred to as a "server system," the present invention contemplates server system 16 comprising any suitable type of processing device or devices for processing electronic messages 18.

Server system 16 includes an electronic messaging application 22. Although described primarily in the singular, server system 16 may include any suitable number and types of electronic messaging applications 22. Electronic messaging application 22 may be operable to facilitate communication of electronic messages, such as electronic message 18 communicated from electronic computing device 12a to electronic computing device 12b. For example, electronic messaging application 22 may interface with electronic messaging applications 20 of electronic messaging devices 12 to facilitate the communication of electronic message 18. In certain embodiments, electronic messaging application 22 may store electronic messages 18 in a suitable memory module associated with server system 16. Electronic messaging application 22 may include any suitable combination of software, firmware, and hardware. As just a few examples, electronic messaging application 22 may include an email application (e.g., MICROSOFT EXCHANGE), a text-messaging application, a VoIP messaging application, or any other suitable type of electronic messaging application 22.

Server system 16 may include an analyzer module 24, which may include any suitable combination of software, firmware, and hardware. Analyzer module 24 may or may not be stored on the same physical computer as electronic messaging application 22. Moreover, electronic messaging application 20 and analyzer module 24 may be integrated to any suitable degree, if appropriate. In certain embodiments, analyzer module 24 includes one or more of an inference engine, text-mining capabilities, case-based reasoning capabilities; and if-then statements or other rules.

Analyzer module 24 is operable to analyze electronic message 18 to determine whether the analyzed electronic message 18 should be delivered to the intended recipient of electronic message 18 at the current time or should be forwarded to a holding pattern for later reanalysis and possible delivery. Analyzer module 24 may receive electronic messages 18 in any suitable manner. As just one example, after receiving electronic message 18 from electronic messaging device 12a, electronic messaging application 22 may call analyzer module 24, so that analyzer module 24 can determine whether electronic message 18 should be delivered to the intended recipient at the current time or should be forwarded into a holding pattern.

Analyzer module 24 may determine whether electronic message 18 should be communicated to the intended recipient at the current time or should be forwarded to a holding pattern in part by determining a priority for electronic message 18. In certain embodiments, analyzer module 24 determines the priority to assign to electronic message 18 according to one or more or more analyzer properties of electronic message 18 and one or more analyzer heuristics, described in more detail below. Additionally or alternatively, analyzer module 24 may determine the priority of electronic message 18 according to one or more machine learning techniques, also described in more detail below.

Server system 16 may be coupled to one or more memory modules 26, which will be referred to throughout the remainder of this description in the singular. Memory module 26 may include any memory or database module and may take the form of volatile or non-volatile memory including, without limitation, magnetic media, optical media, random access memory (RAM), read-only memory (ROM), removable media, or any other suitable memory component. In certain embodiments, memory module 26 includes one or more SQL servers. Memory module 26 may be local to or remote from other components of system 10.

Memory module 26 is operable to store one or more sets of analyzer heuristics each comprising one or more analyzer heuristics 28. Analyzer heuristics 28 may include one or more rules for analyzing electronic messages (e.g., electronic message 18) and for determining whether each electronic message should be delivered to its intended recipient at the current time or should be forwarded to a holding pattern. For example, analyzer module 24 may use analyzer heuristics 28 to determine a priority for each electronic message (e.g., electronic message 18).

For example, analyzer heuristics 28 may include sets of rules related to calendar, priority, white lists, black (or stop) lists, workplace semantics, subject, a reply, an age, organizational rank (e.g., of the sender of the electronic message), an emergency 911 call, or any other suitable heuristics. Calendar rules may relate to the calendar of the intended recipient and may define the windows in the recipient's calendar when electronic messages should and should not be delivered. Priority rules may associate pre-defined importance to electronic messages based on pre-defined criteria (e.g., the identity of the sender). White list rules may provide higher priority to certain individual senders; whereas, black list rules may provide lower priority to certain other individual senders. Semantic rules may consider the content of electronic messages. Subject rules may consider the subject of electronic messages. Reply rules may take into account whether the electronic message is a reply, a forward, or a new electronic message. Age rules may consider the age of the electronic message.

Analyzer module 24 may use any number of other modules or data sets to assist in determining the appropriate priority for electronic message 18. For example, analyzer module 24 may use one or more text parsing tools for determining a portion or all of the content of electronic message 18. As another example, analyzer module 24 may access data associated with the intended recipient of electronic message 18. As particular examples, analyzer module 24 may access a calendar of the intended recipient of electronic message 18, one or more statuses of the intended recipient (e.g., Unavailable, Logged On), or any other suitable data. Analyzer module 24 may use information gathered from these modules and/or data sets in evaluating analyzer heuristics 28.

Priority may be computed determined using analyzer heuristics 28 in any suitable manner. Four example techniques for computing priority from analyzer heuristics 28 are: (1) calculating a priority number using analyzer heuristics 28; (2) determining a priority category using analyzer heuristics 28 (e.g., Hold/Deliver_Shortly/Deliver_Immediately, etc.); (3) a combination of (1) and (2) with a threshold calculation; and (4) determining a membership in multiple sets (e.g., using fuzzy logic).

For example, a priority may be computed from analyzer heuristics 28 in a numerical form (e.g., 0-100) or in a categorical from (e.g., High/Medium/Low). In certain embodiments, analyzer heuristics 28 include a series of IF-THEN rules that uniquely calculate whether and/or when electronic message 18 is delivered. The following provides a particular example IF-THEN rule:

---
IF sent from = employee's manager, THEN
IF sent to = current employee only, THEN
Deliver Immediately.

---

Figure 6:
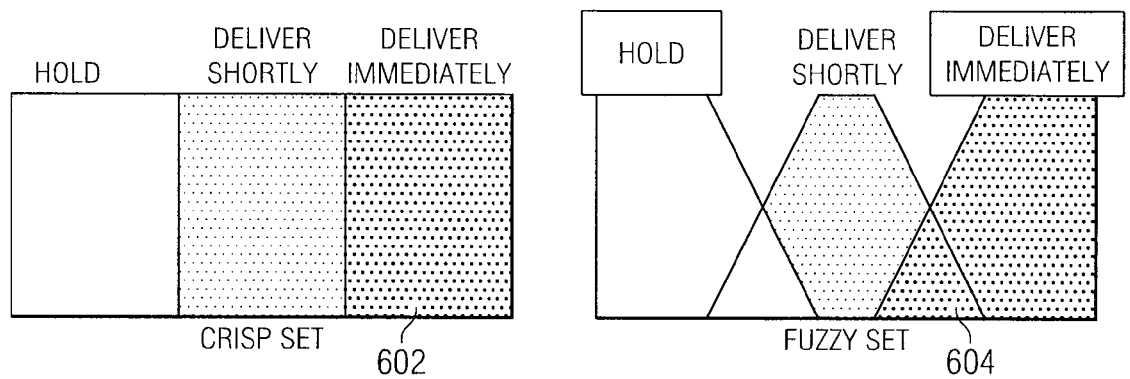
FIG. 6 illustrates example differences between the traditional and fuzzy set membership, according to certain embodiments of the present invention.

As another example, fuzzy set membership may be used to determine priority. With fuzzy membership, the same electronic message 18 may be a partial member of several sets, such as 1%, 20%, 80%. A set may be defined as a collection of objects and can typically be defined by enumerating the set, (e.g., S={1, 2, 3}), or by providing a set membership rule, (e.g., S={x|x∈$Z^+$ and x≤3}). A fuzzy set, F, typically allows partial membership or a degree of truth of membership in a set. In a particular example, this concept may be implemented by a real valued set membership function $f$ with an output range from 0 to 1. An element x is said to belong to F with the degree of truth f(x) and simultaneously to be in ¬F with the degree of truth 1−f(x). For example, if the degree of truth, or membership value, of electronic message 18 being urgent is 0.6, and the value for electronic message 18 being relevant to the current activity is 0.3, the membership value for electronic message 18 being both is 0.3. FIG. 6, described in more detail below, illustrates an example distinction between traditional and fuzzy set membership according to certain embodiments of the present invention.

In certain embodiments, the priority for electronic messages 18 may be determined using one or more machine learning techniques. In certain embodiments, machine learning techniques are algorithms in the areas of artificial intelligence and statistics that estimate an unknown dependency between as system's inputs and outputs from an available sample data set. Machine learning techniques typically involve the design and development of algorithms and techniques that allow computers to extract rules and patterns automatically. These machine learning techniques may include one or more of neural networks, cluster analysis, case-based reasoning, induction, or any other suitable machine learning techniques.

At a general level, there are at least two types of machine learning: inductive and deductive. Inductive machine learning techniques typically involve the extraction of rules and patterns out of data sets. Analyzer module 24 may pass an electronic message 18 to machine learning module 32, described below, which may provide an estimate of the message delivery status based on prior categorized examples. Categorization of delivery priority samples may have been performed manually or by automatic clustering techniques. Additional information regarding machine learning techniques is described in more detail below.

Regardless of what technique is used to assign the priority to electronic message 18, the priority may take any suitable form, according to particular needs. In certain embodiments, the assigned priority comprises a numeric priority value. In certain embodiments, analyzer module 24 is operable to determine the priority for electronic message 18 by computing a numeric priority value for the electronic message and determining a priority level based on the determined priority value, the priority for the electronic message comprising the priority level. The priority level may be one of a number of priority levels, each priority level associated with a corresponding range of numeric priority values. Analyzer module 24 may determine the priority level for the electronic message by determining a particular range of numeric priority values within which the computed priority value falls and determining that the priority level for the electronic message is the priority level that corresponds to the particular range of numeric priority values. As just one example, the determined priority level for electronic message 18 may be one of the following priority levels, from lowest priority to highest: (1) None; (2) Low; (3) Medium; (4) High; (5) Urgent; (6) Immediate; (7) Highest; and (8) Emergency.

As described briefly above, analyzer module 24 may use the determined priority for electronic message 18 to determine whether to initiate current delivery of electronic message 18 to the intended recipient of electronic message 18 or to forward electronic message 18 to a holding pattern. In certain embodiments, analyzer module 24 is operable to compare the determined priority for electronic message 18 to a predetermined priority threshold to determine whether to initiate communication of electronic message 18 to the intended recipient at the current time. For example, if the electronic message 18 currently being analyzed exceeds (or equals, if appropriate) the predetermined priority threshold, then current delivery of electronic message 18 may be initiated. In certain embodiments, the predetermined priority threshold is a numeric value or a priority level, whichever is appropriate. For example, if the intended recipient of electronic message 18 (i.e., the user of electronic messaging device 12b) is currently in a meeting with his boss, then he may have set his priority threshold to the priority level Highest, such that any electronic messages that are assigned a priority level less than Highest will not be currently delivered to the intended recipient.

The value of the priority threshold can be set by the recipient, a system administrator, or in any other suitable manner. In certain embodiments, the setting of the priority threshold for a user may be automatic. Such automated setting could be based on calendar entries (e.g., the calendar indicates that the user is in a meeting), times of day (the user does not liked to be bothered in the morning hours), or any other suitable factors. The value of the priority threshold may be particular to the intended recipient. Moreover, the values for the predetermined priority thresholds may be stored in any suitable location accessible to analyzer module 24.

If analyzer module 24 determines, based on the determined priority for electronic message 18, that electronic message 18 should be delivered to the intended recipient at the current time, then analyzer module 24 may initiate delivery of electronic message 18 to the intended recipient. For example, analyzer module 24 may notify messaging application 22 of server system 16 that it is now acceptable to forward electronic message 18 to the intended recipient.

If analyzer module 24 determines, based on the determined priority for electronic message 18, that electronic message 18 should not be delivered to the intended recipient at the current time, analyzer module 24 may forward electronic message to a holding pattern for reanalysis and delivery to the intended recipient at a later time. In certain embodiments, analyzer module 24 may forward electronic message 18 to a holding pattern queue 30, which may be stored on memory module 26. It should be noted that holding pattern queue 30 is merely an example mechanism for storing electronic messages in a holding pattern, and the present invention contemplates any suitable mechanism for doing so.

Analyzer module 24 may determine if it is appropriate to reanalyze electronic message 18 that has been forwarded to the holding pattern. For example, analyzer module 24 may access electronic message 18 in holding pattern queue 30 to reanalyze electronic messages. If analyzer module 24 determines that it is appropriate to reanalyze electronic message 18, analyzer module 24 may reanalyze electronic message 18 to determine a priority for electronic message 18. When electronic message 18 is reanalyzed, it is possible that the determined priority for electronic message may change. For example, certain parameters of electronic message may have changed (e.g., age of electronic message 18), which may affect the priority for electronic message 18. Additionally or alternatively, the predetermined threshold may have changed since electronic message 18 was last analyzed. Reanalysis may occur at any suitable interval and/or based on any suitable condition, according to particular needs. For example, electronic messages that are forwarded to the holding pattern may be periodically presented to (or accessed by) analyzer module 24 for recalculation of the priority and comparison to the current priority threshold. For example, previously-analyzed electronic messages that were put in a holding pattern that now exceed the priority threshold (e.g., if the threshold has been adjusted since those electronic messages were put on hold) may be delivered in any suitable manner.

In operation of an example embodiment of system 10, a user of electronic messaging device 12a may initiate communication of an electronic message 18. The intended one or more recipients of electronic message 18 may include electronic messaging device 12b. Analyzer module 24 may receive electronic message 18. Electronic message 18 comprises one or more parameters, such as one or more of an intended recipient, Header, From, CC, BCC, Date, Subject, Body, and Path.

Analyzer module 24 may analyze electronic message 18 to determine a priority for electronic message 18. Analyzer module 24 may analyze one or more rules of analyzer heuristics 28 based on relevant parameters of electronic message 18 to determine a priority for electronic message 18. In certain embodiments, the priority may be determined to electronic messages using one or more machine learning techniques. These machine learning techniques may include one or more of neural networks, cluster analysis, case-based reasoning, induction, or any other suitable machine learning techniques. In certain embodiments, the assigned priority may be a numeric priority value or a priority level.

Analyzer module 24 may determine, based on the determined priority for electronic message 18, whether to deliver electronic message 18 to the intended recipient at the current time. In certain embodiments, analyzer module 24 is operable to compare the determined priority for electronic message 18 to a predetermined priority threshold to determine whether to initiate communication of electronic message 18 to the intended recipient at the current time. For example, if the electronic message 18 currently being analyzed exceeds (or equals, if appropriate) the predetermined priority threshold, then current delivery of electronic message 18 may be initiated.

If analyzer module 24 determines, based on the determined priority for electronic message 18, that electronic message 18 should be delivered to the intended recipient at the current time, then analyzer module 24 may initiate delivery of electronic message 18 to the intended recipient. For example, analyzer module 24 may notify messaging application 22 of server system 16 that it is now acceptable to forward electronic message 18 to the intended recipient.

If analyzer module 24 determines, based on the determined priority for electronic message 18, that electronic message 18 should not be delivered to the intended recipient at the current time, then analyzer module 24 may initiate forwarding of electronic message 18 to a holding pattern for reanalysis and delivery to the intended recipient at a later time. In certain embodiments, analyzer module 24 may forward electronic message 18 to holding pattern queue 30, which may be stored on memory module 26.

Analyzer module 24 may determine if it is appropriate to reanalyze electronic message 18 that has been forwarded to the holding pattern. For example, analyzer module 24 may access electronic message 18 in holding pattern queue 30 to reanalyze electronic message 18. If analyzer module 24 determines that it is appropriate to reanalyze electronic message 18, analyzer module 24 may reanalyze electronic message 18 to determine a priority for electronic message 18. Reanalysis may occur at any suitable interval and/or based on any suitable condition, according to particular needs. If analyzer module 24 determines at step 210 that it is not appropriate to reanalyze electronic message 18, then analyzer module 24 may keep electronic message 18 in the holding pattern. For example, electronic message 18 may continue to be stored in holding pattern queue 30.

In certain embodiments, server system 16 includes a machine learning module 32, which may use one or more machine learning techniques to improve the ability of system 10 to manage delivery of electronic messages. For example, the machine learning techniques used by machine learning module 32 may allow system 10 to improve its ability to accurately determine whether to forward electronic messages to the intended recipient at the current time. Machine learning module 32 may include any suitable combination of software, firmware, and hardware. Machine learning module 32 may implement one or more machine learning techniques, such as neural networks, cluster analysis, case-based reasoning, induction, or any other suitable machine learning techniques.

The present invention may be operable to capture feedback from the recipient of electronic message 18, the feedback indicating whether electronic message 18 was delivered in an appropriate or inappropriate manner. The recipient may provide feedback by marking electronic message 18 as either appropriate (if electronic message 18 was forwarded in an appropriate manner) or inappropriate (if electronic message 18 was forwarded in an inappropriate manner). The recipient's feedback and electronic message 18 may be analyzed by machine learning module 32 using one or more machine learning techniques. Based on the analysis of the feedback and electronic message 18, machine learning module 32 may update one or more analyzer heuristics 28 in memory module 16.

The following description of machine learning is provided for example purposes only and should not be used to limit the present invention. Machine learning is an area of artificial intelligence concerned with automated recognition of patterns and rules from events. The input to a machine learning system is generally a data set or a set of facts, and the output is generally a correlation or heuristic. Machine learning tools generally attempt to discern hidden relationships among data points, explain the discovered relationships, generate new rules, and help predict future events based on the current state.

Machine learning systems generally fall into two categories, deductive learning and inductive learning. Deductive learning is generally based on reasoning (deductive logic) among premises and conclusions, where if a premise is logically True, the conclusion must be True. The purpose of deductive reasoning is to directly generate a heuristic, in the IF-THEN form that is logically based on and a representative of a set of events. For example, a drug store transactional database may lead to the heuristic "IF a customer buys diapers on Saturday, THEN the customer is 35% likely to also buy beer." Inductive reasoning is generally based on statistical and multi-variant analysis, where clusters and correlations within large sources are discovered using algorithms. Neural networks, K-means, genetic algorithms, and case-based reasoning are some examples of inductive reasoning.

With respect to certain embodiments of the present invention, in a static business environment, the heuristics used by analyzer module 24 may remain fairly unchanged over long periods of time, in which case analyzer heuristics 28 in memory module 26 may be manually developed and maintained. However, in a more typical dynamic business environment, analyzer heuristics 28 may change more frequently. In such a dynamic business environment, manual maintenance of analyzer heuristics 28 may be difficult or impossible due to the frequency and amount of information to be analyzed and/or updated. Changes to analyzer heuristics 28 in a dynamic business environment may involve new projects, new organizational structure, new clients, new vendors, or other suitable factors.

In certain embodiments, it is desirable for the present invention to be adaptive to changing business environments by autonomously learning and deploying new analyzer heuristics 28, or by changing or deleting obsolete analyzer heuristics 28. Machine learning module 32 may discover new analyzer heuristics 28 or update existing analyzer heuristics 30, which may improve the accuracy of analyzer module 24 in determining which electronic messages to immediately forward to the intended recipient and which to forward to a holding pattern. Machine learning module 32 may leverage a deductive machine learning technique, an inductive machine learning technique, or other suitable techniques. Machine learning module 32 may use feedback from users (e.g., recipients of electronic messages) to facilitate this learning. For example, if the user indicates that the electronic message was forwarded in an appropriate manner, then the pattern in the current electronic message may be reinforced, and similar electronic messages in the future may have a higher probability of being marked as appropriate, via a higher probability. As another example, if the user indicates that the electronic message was forwarded in an inappropriate manner, then the current electronic message may be inhibited, and similar electronic messages in the future may have a lower probability of being marked as appropriate.

In certain embodiments, the basis for machine learning is the parameters of an electronic message. These parameters may be similar (or the same as) the parameters considered by analyzer heuristics 28. For example, if an electronic message with "Subject=Project ABC" is given a high priority, and the recipient indicates that the electronic message was forwarded in an inappropriate manner, then future electronic messages that include a subject of "Project ABC" may be assigned a lower priority.

Machine learning module 32 may not be limited to one-to-one or linear relationships. In other words, machine learning module 32 may consider multiple parameters of electronic messages. For example, where "Subject=Project ABC; and Attachments=No" is marked as inappropriate (based on feedback received from a recipient), and "Subject=Project ABC, and Attachments=Yes" is marked as appropriate (based on feedback received from a recipient), then electronic messages from Project ABC which have an attachment may be assigned a high priority.

TABLE 1, below, illustrates an example dataset regarding electronic message parameters and recipient feedback.

TABLE 1

| Subject | To | Attachment | Recipient Feedback |
|---|---|---|---|
| Project ABC | 1 person | No | Yes |
| Project 123 | 12 persons | Yes | No |
| Project 123 | 1 person | No | Yes |
| Project ABC | 10 persons | Yes | No |
| Project ABC | 2 persons | No | Yes |
| Project 123 | 3 persons | Yes | No |

A deductive learning approach may use frequency analysis to conclude the following analyzer heuristics 28 from the example dataset in TABLE 1 regarding the probability that an electronic message should be delivered to an intended recipient, where the final probability is a function of the applicable analyzer heuristics 28:

1. IF "Subject=Project ABC", THEN "Probability=67%"
2. IF "Subject=Project 123", THEN "Probability=33%"
3. IF "To<3 persons", THEN "Probability=100%"
4. IF "To>3 persons", THEN "Probability=0%"
5. IF "Attachment=Yes", THEN "Probability=0%"
6. IF "Attachment=No", THEN "Probability=100%"

Analyzer heuristics 28 may also contain compound clauses, such as the following:

1. IF "Subject=Project ABC" AND "To<3", THEN "Probability=100%"
2. IF "Subject=Project 123" AND "To<2" AND "Attachment=Yes", THEN "Probability=0%"

An inductive learning approach may use techniques such as neural nets or case-based reasoning to determine the probability of the delivery of an electronic message. Typically, an inductive learning approach may use many more records in the dataset but may render less rigid and more accurate results.

In operation of an example embodiment of system 10, electronic message 18 may be forwarded to its recipient (e.g., electronic messaging device 12b). For example, analyzer module 24 may have decided that it was appropriate to initiate delivery of electronic message 18 to its intended recipient at the current time. The recipient of electronic message 18 (e.g., the user of electronic messaging device 12b) may determine whether electronic message 18 was forwarded in an appropriate manner. The manner in which an electronic message 18 is forwarded to its intended recipient may be appropriate or inappropriate. The manner in which electronic message 18 was communicated to its intended recipient may involve whether electronic message 18 should have been delivered to the intended recipient. For example, electronic message 18 may be a message that should not have been delivered at all to the intended recipient for any of a variety of reasons. Additionally or alternatively, the manner in which electronic message 18 was communicated to its intended recipient may involve whether electronic message 18 should have been delivered to the intended recipient at the time at which the electronic message was delivered. For example, the recipient of electronic message 18 may determine whether electronic message 18 should have been delivered when it was or should have been put in a holding pattern. This determination could include the recipient reviewing the priority that was assigned by analyzer module 24 to electronic message 18 and determining whether that priority was appropriate.

If the recipient determines that electronic message 18 was forwarded in an appropriate manner, then electronic message 18 may be marked as appropriate and this feedback may be communicated from the recipient to server system 16. In certain embodiments, electronic message 18 may also be communicated from the recipient to server system 16. If the recipient determines that electronic message 18 was forwarded in an inappropriate manner, then electronic message 18 may be marked as inappropriate and this feedback may be communicated from the recipient to server system 16. In certain embodiments, electronic message 18 may also be communicated from the recipient to server system 16.

Analyzer module 24 (or another suitable component of system 10) may receive the feedback from the recipient. If electronic message 18 was communicated along with the feedback, electronic message 18 may also be received. The feedback received from the recipient of electronic message 18 may indicate that electronic message 18 was delivered in either an appropriate or inappropriate manner.

Machine learning module 32 may analyze the feedback received from the recipient of electronic message 18 using one or more machine learning techniques. In certain embodiments, analyzer module 24 receives the feedback at step 308 and either forwards the feedback to machine learning module 32 or otherwise cooperates with machine learning module 32 to analyze the feedback using one or more machine learning techniques. Additionally or alternatively, the feedback may be communicated directly to machine learning module 32 for analysis. Machine learning module 32 may use neural networks, cluster analysis, case-based reasoning, induction, or any other suitable machine learning technique.

Machine learning module 32 (or another suitable component of system 10) may update analyzer heuristics 28 based on the analysis of the feedback received from the recipient. Updating analyzer heuristics 28 may include taking no action with respect to analyzer heuristics 28, modifying an existing analyzer heuristic 28, adding an analyzer heuristic 28, or deleting an analyzer heuristic 28.

Over time, analyzer module 24 may initiate delivery of a number of electronic messages to an intended recipient, and feedback for at least a portion of these delivered electronic messages may be received from the intended recipient. This received data set may allow system 10 to "learn" from the intended recipient and to improve its ability to determine whether and when to deliver electronic messages 18.

Although various modules illustrated and described separately, may be combined in any suitable manner. Additionally, although the present invention has been primarily described with a single sender and a single recipient, this is for simplicity of explanation. In operation, analyzer module 24 will likely handle receipt numerous electronic messages from numerous senders, as well as delivery of numerous messages to numerous recipients. Moreover, although the present invention has been described primarily with respect to use in a business environment, the present invention contemplates managing delivery of electronic messages in any suitable environment, according to particular needs. In certain embodiments, a portion or all of analyzer module 24 and memory module 16 may be implemented in an expert system tool, such as HALEY BUSINESS RULES SUITE.

Particular embodiments of the present invention may provide one or more technical advantages. In certain embodiments, the present invention reduces the cognitive overload caused by excessive electronic messages 18. This may reduce office worker distractions due to excessive electronic messages 18. In certain embodiments, the flow of interruptions to a user may be controlled, enabling the user to control distractions by prioritizing and controlling incoming electronic messages 18. The present invention may prioritize electronic messages 18 and content so that the volume of information the user must process is reduced to a manageable volume.

In certain embodiments, using multiple heuristics 28 may allow electronic messages 18 to be prioritized based on multiple factors. The present invention may allow preferred or otherwise important electronic messages 18 to be processed and delivered first. In certain embodiments, the accuracy of the present invention is improved based on feedback from recipients of electronic messages 18.

In certain embodiments, the present invention provides a single, integrated, and context-sensitive solution for managing distractions associated with electronic messages 18. In certain embodiments, the present invention provides one or more of the following: (1) device independent messaging notification; (2) electronic mail filtering system; (3) enabling wireless messaging systems to use alternative message delivery mechanisms; (4) filtering IMs by context; (5) handling presence messages; (6) information filtering using measures of affinity of a relationship; (7) IM priority filtering based on content and hierarchical schemes; (8) processing rules for digital messages; (9) controlling and organizing email; and (10) voicemail notification. In certain embodiments, the present invention may enable rapid and reliable emergency communications while maintaining control of spurious or lower-priority requests.

In contrast to certain previous and existing solutions for managing delivery of electronic messages, certain embodiments of the present invention provide a context-sensitive, integrated solution that spans multiple forms of electronic communication. In contrast to certain previous and existing solutions that require users to manually review electronic messages 18 from individuals on a "permission list" to determine if the messages 18 are important enough to require immediate attention, certain embodiments of the present invention analyze electronic messages 18 based on a set of heuristics that provide a context-sensitive analysis of the electronic messages 18 rather than a simple permission list. Certain previous and existing solutions merely provide features that allow a user to simply turn off a messaging device or otherwise implement a "do not disturb" feature. However, these features may cause an intended recipient to miss electronic messages 18 that the recipient is willing to accept at a given time. In contrast, certain embodiments of the present invention improve a user's ability to receive certain appropriate electronic communications at a given time, while delaying (or blocking) other electronic communications until a later time.

Figure 2:
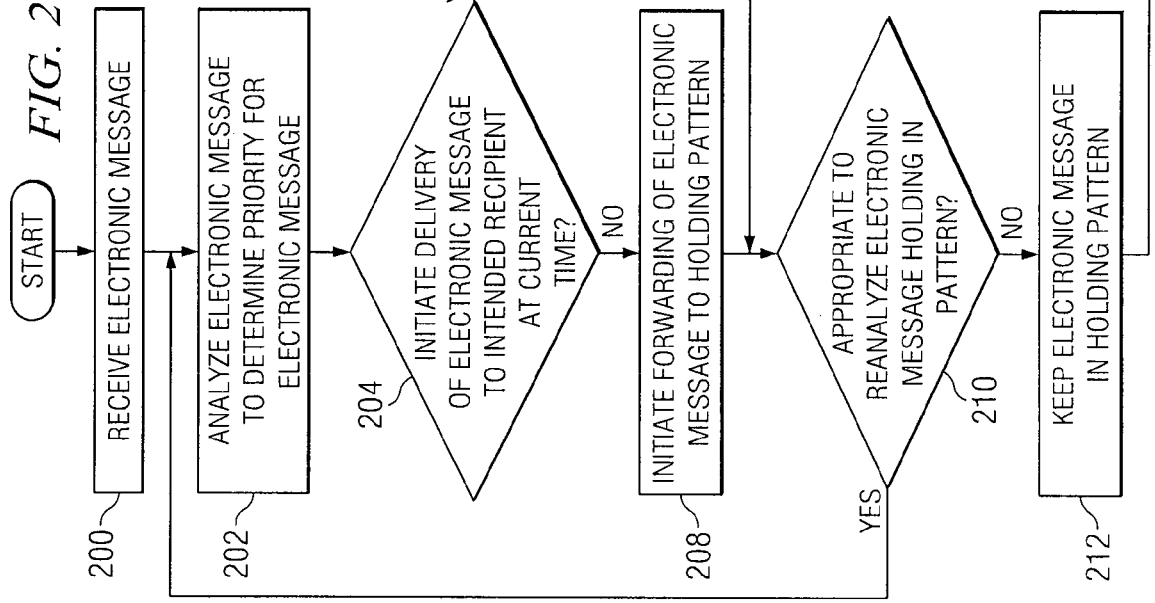
FIG. 2 illustrates an example method for managing delivery of electronic messages, according to certain embodiments of the present invention.

FIG. 2 illustrates an example method for managing delivery of electronic messages, according to certain embodiments of the present invention. The method may be implemented in any suitable combination of software, firmware, and hardware, according to particular needs. Although particular components may be identified as performing particular steps, the present invention contemplates any suitable components performing the steps according to particular needs.

This particular example method will be described with respect to a single electronic message 18 being communicated from a first electronic messaging device 12a (the sender) to a second electronic messaging device 12b (the recipient). Moreover, it will be assumed for purposes of this example that electronic message 18 has one intended recipient. It should be noted, however, that electronic message 18 could have multiple intended recipients. In certain embodiments, analyzer module 24 is operable to make a separate determination with respect to each intended recipient if an electronic message 18 has multiple intended recipients.

At step 200, analyzer module 24 may receive electronic message 18. Electronic message 18 may be received from a messaging application 22 of server system 16, having originated from a sender such as electronic messaging device 12a (e.g., using electronic messaging application 20a). Electronic message 18 comprises one or more parameters, such as one or more of an intended recipient.

At step 202, analyzer module 24 may analyze electronic message 18 to determine a priority for electronic message 18. In certain embodiments, analyzer module 24 accesses one or more parameters of electronic message 18 and one or more analyzer heuristics 28 (e.g., stored in memory module 26). Analyzer module 24 may analyze one or more rules of analyzer heuristics 28 based on relevant parameters of electronic message 18 to determine a priority for electronic message 18.

In certain embodiments, the priority may be determined to electronic messages using one or more machine learning techniques. As described above, these machine learning techniques may include one or more of neural networks, cluster analysis, case-based reasoning, induction, or any other suitable machine learning techniques.

As described above with reference to FIG. 1, the priority determined for electronic message 18 may take any suitable form, according to particular needs. In certain embodiments, the assigned priority comprises a numeric priority value. In certain embodiments, analyzer module 24 is operable to determine the priority for electronic message 18 by computing a numeric priority value for the electronic message and determining a priority level based on the determined priority value, the priority for the electronic message comprising the priority level. The priority level may be one of a number of priority levels, each priority level associated with a corresponding range of numeric priority values. Analyzer module 24 may determine the priority level for the electronic message by determining a particular range of numeric priority values within which the computed priority value falls and determining that the priority level for the electronic message is the priority level that corresponds to the particular range of numeric priority values. As just one example, the determined priority level for electronic message 18 may be one of the following priority levels, from lowest priority to highest: (1) None; (2) Low; (3) Medium; (4) High; (5) Urgent; (6) Immediate; (7) Highest; and (8) Emergency.

At step 204, analyzer module 24 may determine, based on the determined priority for electronic message 18, whether to deliver electronic message 18 to the intended recipient at the current time. In certain embodiments, analyzer module 24 is operable to compare the determined priority for electronic message 18 to a predetermined priority threshold to determine whether to initiate communication of electronic message 18 to the intended recipient at the current time. For example, if the electronic message 18 currently being analyzed exceeds (or equals, if appropriate) the predetermined priority threshold, then current delivery of electronic message 18 may be initiated. In certain embodiments, the predetermined priority threshold is a numeric value or a priority level, whichever is appropriate. For example, if the intended recipient of electronic message 18 (i.e., the user of electronic messaging device 12b) is currently in a meeting with his boss, then he may have set his priority threshold to the priority level Highest, such that any electronic messages that are assigned a priority level less than Highest will not be currently delivered to the intended recipient.

As a particular example, the predetermined threshold may be a numeric threshold value, and analyzer module 24 may compare the computed numeric priority value for electronic message 18 to the predetermined threshold to determine if the priority of electronic message 18 exceeds (or equals, if appropriate) the predetermined threshold priority. As another particular example, the predetermined threshold may be a threshold priority level, and analyzer module 24 may compare the determined priority level for electronic message 18 to the predetermined threshold level to determine if the priority of electronic message 18 exceeds (or equals, if appropriate) the predetermined threshold priority.

If at step 204 analyzer module 24 determines, based on the determined priority for electronic message 18, that electronic message 18 should be delivered to the intended recipient at the current time, then at step 206 analyzer module 24 may initiate delivery of electronic message 18 to the intended recipient. For example, analyzer module 24 may notify messaging application 22 of server system 16 that it is now acceptable to forward electronic message 18 to the intended recipient.

If at step 204 analyzer module 24 determines, based on the determined priority for electronic message 18, that electronic message 18 should not be delivered to the intended recipient at the current time, then at step 208 analyzer module 24 may initiate forwarding of electronic message 18 to a holding pattern for reanalysis and delivery to the intended recipient at a later time. In certain embodiments, analyzer module 24 may forward electronic message 18 to holding pattern queue 30, which may be stored on memory module 26. It should be noted that holding pattern queue 30 is merely an example mechanism for storing electronic messages in a holding pattern, and the present invention contemplates any suitable mechanism for doing so.

At step 210, analyzer module 24 may determine if it is appropriate to reanalyze electronic message 18 that has been forwarded to the holding pattern. For example, analyzer module 24 may access electronic message 18 in holding pattern queue 30 to reanalyze electronic message 18. If analyzer module 24 determines at step 210 that it is appropriate to reanalyze electronic message 18, then the method may return to step 202 for analyzer module 24 to reanalyze electronic message 18 to determine a priority for electronic message 18.

When electronic message 18 is reanalyzed, it is possible that the determined priority for electronic message 18 may change. For example, certain parameters of electronic message 18 may have changed (e.g., age of electronic message 18), which may affect the priority for electronic message 18. Additionally or alternatively, the predetermined priority threshold may have changed since electronic message 18 was last analyzed. Reanalysis may occur at any suitable interval and/or based on any suitable condition, according to particular needs. For example, electronic messages that are forwarded to the holding pattern may be periodically presented to (or accessed by) analyzer module 24 for recalculation of the priority and comparison to the current priority threshold. For example, previously-analyzed electronic messages that were put in a holding pattern that now exceed the priority threshold (e.g., if the threshold has been adjusted since those electronic messages were put on hold) may be delivered in any suitable manner.

If analyzer module 24 determines at step 210 that it is not appropriate to reanalyze electronic message 18, then at step 212 analyzer module 24 may keep electronic message 18 in the holding pattern. For example, electronic message 18 may continue to be stored in holding pattern queue 30.

Figure 3:
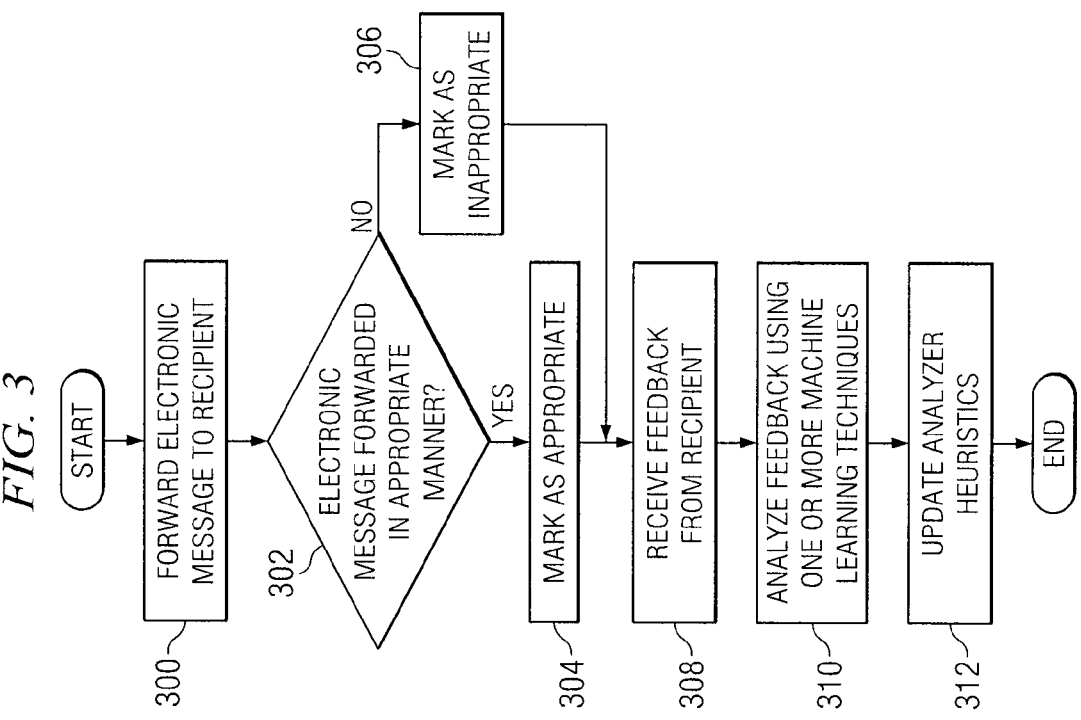
FIG. 3 illustrates an example method for using one or more machine learning techniques to improve the management of the delivery of electronic messages, according to certain embodiments of the present invention.

FIG. 3 illustrates an example method for using one or more machine learning techniques to improve the management of the delivery of electronic messages, according to certain embodiments of the present invention. The method may be implemented in any suitable combination of software, firmware, and hardware, according to particular needs. Although particular components may be identified as performing particular steps, the present invention contemplates any suitable components performing the steps according to particular needs. Again, for purposes of this example only, it will be assumed that electronic message 18 has only one intended recipient.

At step 300, electronic message 18 is forwarded to its recipient (e.g., electronic messaging device 12b). For example, analyzer module 24 may have decided that it was appropriate to initiate delivery of electronic message 18 to its intended recipient at the current time. At step 302, a determination is made regarding whether electronic message 18 was forwarded to the recipient in an appropriate manner. For example, the intended recipient (e.g., the user of electronic messaging device 12b) may manually determine whether electronic message 18 was forwarded in an appropriate manner. Appropriate forwarding may occur when electronic message 18 was forwarded to the recipient and in fact it should have been. Inappropriate forwarding may occur when electronic message 18 was forwarded to the recipient and it should not have been forwarded. Inappropriate forwarding could be based on the time at which electronic message 18 was forwarded or other parameters of electronic message 18.

If it is determined at step 302 that electronic message 18 was forwarded to the recipient in an appropriate manner, then at step 304, electronic message 18 may be marked as appropriate and this feedback may be communicated from the recipient to server system 16. In certain embodiments, electronic message 18 may also be communicated from the recipient to server system 16.

If it is determined at step 302 that electronic message 18 was forwarded to the recipient in an inappropriate manner, then at step 306, electronic message 18 may be marked as inappropriate and this feedback may be communicated from the recipient to server system 16. In certain embodiments, electronic message 18 may also be communicated from the recipient to server system 16.

At step 308, analyzer module 24 (or another suitable component of system 10) may receive the feedback from the recipient. If electronic message 18 was communicated along with the feedback, electronic message 18 may also be received. The feedback received from the recipient of electronic message 18 may indicate that electronic message 18 was delivered in either an appropriate or inappropriate manner.

At step 310, machine learning module 32 may analyze the feedback received from the recipient of electronic message 18 using one or more machine learning techniques. In certain embodiments, analyzer module 24 receives the feedback at step 308 and either forwards the feedback to machine learning module 32 or otherwise cooperates with machine learning module 32 to analyze the feedback using one or more machine learning techniques. Additionally or alternatively, the feedback may be communicated directly to machine learning module 32 for analysis. As described above, machine learning module 32 may use neural networks, cluster analysis, case-based reasoning, induction, or any other suitable machine learning technique.

At step 312, machine learning module 32 (or another suitable component of system 10) may update analyzer heuristics 28 based on the analysis of the feedback received from the recipient. Updating analyzer heuristics 28 may include taking no action with respect to analyzer heuristics 28, modifying an existing analyzer heuristic 28, adding an analyzer heuristic 28, or deleting an analyzer heuristic 28.

Although particular methods have been described with reference to FIGS. 2-3, the present invention contemplates any suitable methods in accordance with the present invention. Thus, certain of the steps described with reference to FIGS. 2-3 may take place substantially simultaneously and/or in different orders than as shown and described. Moreover, components of system 10 may use methods with additional steps, fewer steps, and/or different steps, so long as the methods remain appropriate.

Figure 4:
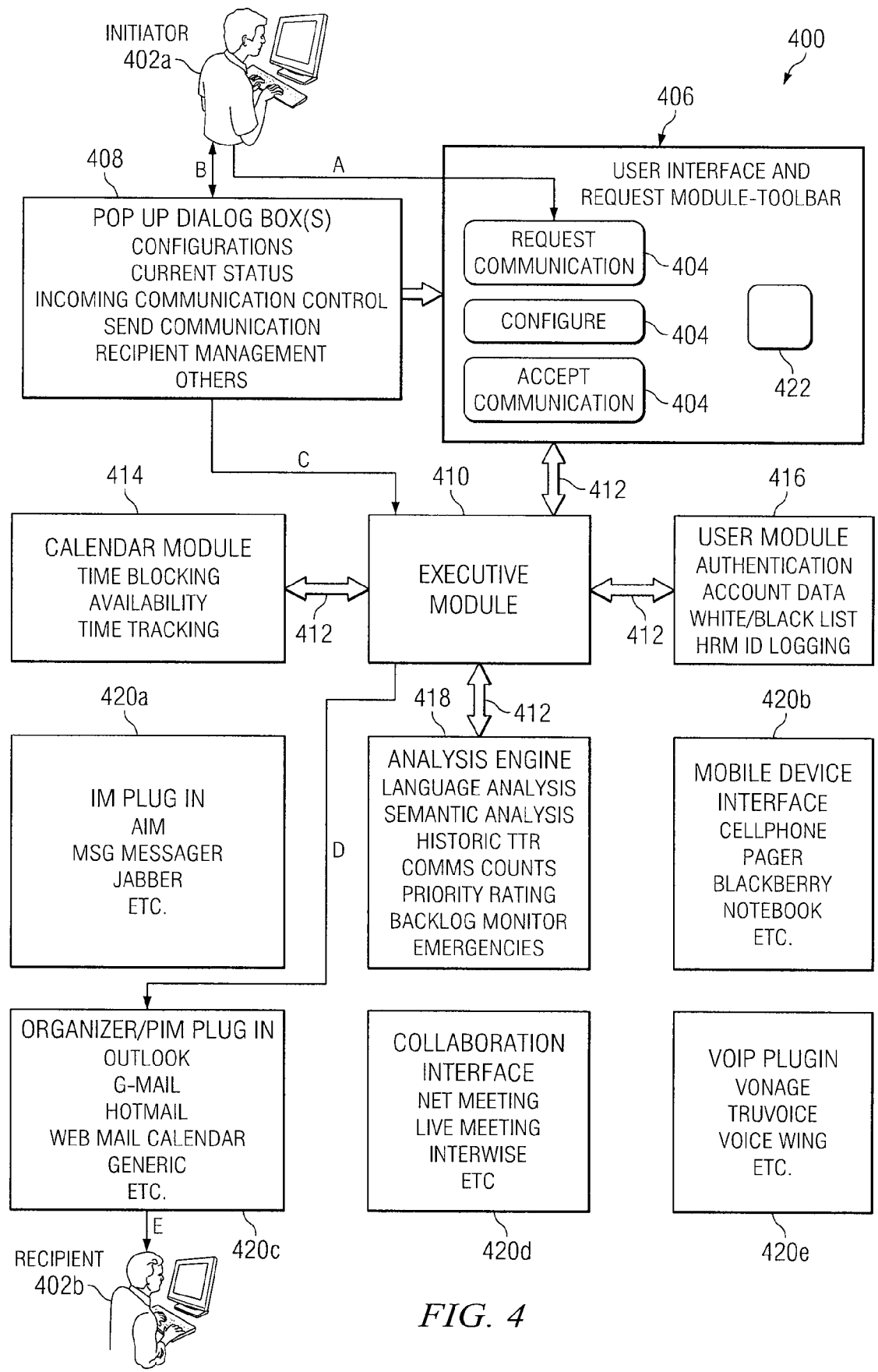
FIG. 4 illustrates another example system for managing delivery of electronic messages, according to certain embodiments of the present invention.

FIG. 4 illustrates another example system 400 for managing delivery of electronic messages, according to certain embodiments of the present invention. As indicated at A, user 402a may initiate a request for communication (i.e., of one or more electronic messages 18), such as by clicking on one of several controls 404 in user interface 406. User interface 406 may generates a dialog box 408 in accordance with the particular control 404 selected by user 402a. As indicated at B, user 402a may interact with dialog box 408, which is operable to receive the user preferences appropriate for the communication that user 402a seeks to initiate. For example, user 402a may seek to send a medium priority electronic message 18 with a recipient 402b and may wish to restrict electronic message 18 to IM, email, or VoIP.

As indicated at C, dialog box 408 may pass the request of user 402a back to user interface 406, which is in communication with an executive module 410 through a predefined interface 412. Executive module 410 may gather data from various other specialized modules as appropriate through pre-defined interfaces 412. In the illustrated embodiment, system 400 includes a calendar module 414, a user module 416, and an analysis engine 418. Executive module 410 may query user module 416 to secure data around the authentication of user 402a to various types of local client software, authentication to the client machine of user 402b, user 402b status on various client-managed black and white lists, to determine the forwarding status of user 402b, and to open a log entry of the request which may be filed and referenced by 402b's client ID.

Executive module 410 may then query calendar module 414 for information around the current status and availability of user 402b for installed and authorized modes of communication. Executive module 410 may store the data or access it as needed on shared resources, such as a MICROSOFT OUTLOOK calendar or web-based calendar tools. Calendar module 414 may determine what times are blocked out for user 402b, for which types of activities (e.g., meetings, vacation, etc.) these times are blocked, and the priority of these activities. Calendar module 414 may retrieve time blocks that are open for users on the same level as user 402a, and blocks that are open to medium-priority communications (as requested by user 402a in this example), and blocks that are open to the preferred communication modes of user 402a (e.g., IM, email, and VoIP). Calendar module 414 may pass the retrieved data to executive module 410.

Executive module 410 may pass the data received from calendar module 414 through pre-defined interface 412 to analysis engine 418. Analysis engine 418 examines the request of user 402a, assigns a priority to the request, and examines the calendar data (identifying available times for the type and priority of communication requested) to identify the first time slot on the calendar of user 402b that is open to user 402a, the priority, and the mode of communication.

In this example, analysis engine 418 may determine that the first time slot available to transmit electronic message 18 from user 402a to user 402b permits email communication only for users at the priority level of user 402a. Analysis engine 418 may pass this data to executive module 410, which may determines that there is a suitable interface 420 to support the communication (as indicated at D) and opens interface 420 for user input. In this example, the email may be sent as soon as it is ready (as indicated at E), as the client software of user 402b may prevent user 402b from seeing the email until the appropriate time. In another example in which executive module 410 determines that the appropriate mode of communication is IM (which was also identified as acceptable to user 402a in this example), executive module 410 may accept text which would not be passed to the IM client until the appropriate time.

Assume now that user 402b becomes the initiator of an electronic message 18. Also assume that system 400 supports a pre-defined hierarchy for prioritizing electronic messages that runs as follows, from lowest priority to highest: (1) None; (2) Low; (3) Medium; (4) High; (5) Urgent; (6) Immediate; (7) Highest; and (8) Emergency. For the purposes of this example, user 402 may send electronic message 18 using standard email software (e.g., MICROSOFT OUTLOOK), and the email software of user 402a may receive this email. The email client for user 402a may send a notification to the client software of user 402a through the Organizer/PIM plug- of user 402a. This notification may be routed, with the text of email to executive module 410.

Executive module 410 may gather data pertinent to the email from various other specialized modules (e.g., calendar module 414, user module 416, and analysis engine 418) through predefined interfaces 412. Executive module 410 may query user module 416 and determines that user 402b is not a user of the client but that several log entries exist for prior communications with the user. User module 416 may determine that the name and email address of user 402b appear in a user-defined group called "Family" for user 402a. User module 416 may passes this data and the email with the log data to the executive module 410.

Executive module 410 may query calendar module 414 and determine that user 402a is currently in a user-defined status named "Heads Down". Calendar module 414 may return this data to executive module 410 via predefined interface 412. Executive module 410 may pass the gathered data to analysis engine 418 with a request for further analysis.

Analysis engine 418 may consider the current "Heads Down" status of user 402a and determine that all communication below a defined status of "Urgent" are restricted in all modes at the current time. Analysis engine 418 may then subject the email to a semantic analysis. Suppose keywords found in the text include "baby," "home," and "love." These keywords may cause analysis engine 418 to flag the email as personal and important (or unimportant, as may be appropriate). Analysis engine 418 may review the log data and determine that electronic messages from user 402b have been common and the total-time-to-respond of user 402a to messages from user 402b has been exceptionally short. Analysis engine 418 may further determine that historically, user 402a has often over-ridden system priority settings of "medium" to reply to electronic communications from user 402b. Analysis engine 418 may determine that, although this email is assigned a default priority of medium, the appropriate priority should be "high." Analysis engine 418 may analyze the received user data and determine that all communications from the group "Family" are to be considered "urgent." Analysis engine 418 may mark the email and return control to executive module 410.

Executive module 410 may instruct user interface 406 to interrupt user 402a with a signal and by highlighting the "Accept Communication" control 404. A dialog box 408 may appear to user 402a that displays key data including regarding the electronic communication, including the email address of the sender (user 402b), selected lines of text from the email, and the recommended "urgent" priority of the email. User 402a may select the Accept Communication control 404, and in response the full email may be displayed. User interface 406 may report the disposition of the email to executive module 410, which may instructs user module 416 to update its logs with the disposition.

It is also useful to note that the interactions described herein could be driven by pre-defined groups, user-defined groups, and even enterprise groups. An example, predefined group may be "User's Leaders," which may include user 402a's direct and group managers. In certain embodiments, all incoming electronic messages from members of this group might be escalated to "Immediate" priority by to ensure that those electronic messages receive appropriately rapid responses. Another example predefined group may be an "Enterprise Leadership" group. Electronic messages from members of this group may be assigned to "Highest" priority, so that an electronic message from the CEO may cut through any existing communications unless the priority of the message is specifically set lower by the sender. In certain embodiments, any user 402 may be permitted to send an "Emergency" message, which may have a priority set to "Emergency" and may override the preset preferences of the recipient user. Emergency messages may be logged and tracked by the system to prevent abuse.

In certain embodiments, user interface 406 includes a 911 button 422, which may allow user 402a to request emergency assistance at any time. In this example, multiple simultaneous clicks within a measured period of time on a "911" button 422 may forward a series of messages to predefined recipients. For example, user 402a may predefine nearby co-workers and his or her managers as recipients of 911 communications. The enterprise might also define corporate security, human resources, and legal departments as simultaneous recipients of all 911 communications.

In certain embodiments, system 400 may provide a mechanism for overflow control. For example, urgency often can be detected in behavior or generated as a result of inattention. With respect to behavior, user 402b may place a number of VoIP phone calls in a period of ten minutes in an attempt to reach trying to reach user 402a. Analysis engine 418 may be operable to recognize this fact and, combined with other user and historic data, determine that the priority of an electronic message should be increased. With respect to inattention, analysis engine 418 may determine that the number of unread emails that have accumulated in the mailbox of user 402a has exceeded a predefined limit, which may trigger an alert that work is piling up. A popup may be generated, which may prod user 402a to review his or her inbox.

Figure 5:
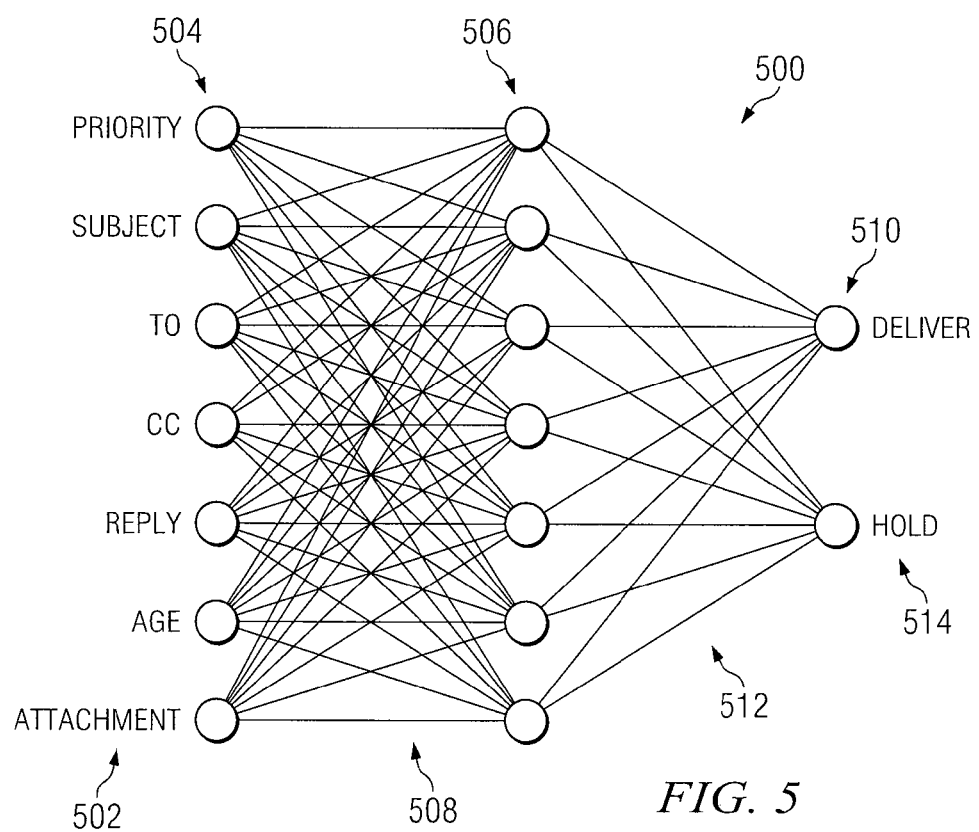
FIG. 5 illustrates an example feed-forward, three-layer neural network that maps a set of electronic message parameters to the decision of whether to deliver the electronic message at the current time.

FIG. 5 illustrates an example feed-forward, three-layer neural network 500 that maps a set of electronic message parameters 502 to the decision of whether to deliver the electronic message at the current time. For purposes of this example, machine learning module 32 is implemented using neural network technology. For example, machine learning module 32 may be implemented using a commercial neural nets engine such as NEURODIMENSION. The input vector may include measurable parameters of electronic message 18, such as From, To, CC, BCC, Subject, Size, Attachments, Date, Priority, and Confidentiality. The output vector may include a numerical value indicating the probability that electronic message 18 should be currently delivered. The neural network output may be used by the analyzer module 24 to compute the priority of electronic message 18. In certain embodiments in which the machine learning module 32 with neural networks or other machine learning technique is used, an automatic induction of analyzer rules is made, with minimal to no human intervention (such as manual feedback or pre-labeling of a training set).

In a feed-forward neural network, a set of input neurons 504 receive input, where each input neuron 504 represents a parameter 502. Input neurons 504 provide their output to the neuron in the hidden layer 506 using connections 508. The output of hidden neurons 506 may be further propagated to output neurons 510 using connection 512. Each output neuron 510 may be associated with an output 514.

Other neural network configurations may map various electronic message parameters to various decisions. A case-based reasoning approach, for example, may use a substantially identical dataset to reach similar decisions.

FIG. 6 illustrates example differences between the traditional and fuzzy set membership, according to certain embodiments of the present invention. For purposes of this example, assume there are three categories or sets into which an electronic message 18 can be classified (i.e., Hold, Deliver Shortly, and Deliver Immediately). The traditional (or crisp) set 602 membership values are mutually exclusive, which means an electronic message 18 is exclusively categorized based on a set of criteria, as in the example of IF-THEN heuristics described above. Fuzzy set 604 is represented by the triangular view of set membership values. In the example representation of fuzzy set 604, there is a gradual decrease for the set membership in the Hold set and there is a gradual increase and decrease for the set membership in the Deliver Shortly set, while there is a gradual increase in the set membership for Deliver Immediately set.

Fuzzy logic may allow reasoning with uncertainty. For example, in addition to outcomes of "True" and "False," fuzzy logic may allow an outcome of "Maybe." Assuming that x and y are fuzzy logic statements and that $m(x)$ is the membership value, the following values may be used to define the results of the following operations:

$$m(\neg x)=1-m(x);$$

$$m(x \cap y)=\min(m(x),m(y));\text{ and}$$

$$m(x \cup y)=\max(m(x),m(y)).$$

Typically, a fuzzy logic rule has the general format of a conditional proposition, as illustrated below:

IF x is A, THEN y is B, where A and B are linguistic values defined by fuzzy sets. The following provides a non-limiting example:

IF [incoming electronic message 18] is [a reply], THEN [content] is [relevant];

IF [sender] is [external], THEN [content] is NOT [relevant]; and

IF [content] is [relevant], THEN [priority]=[medium].

Figure 7:
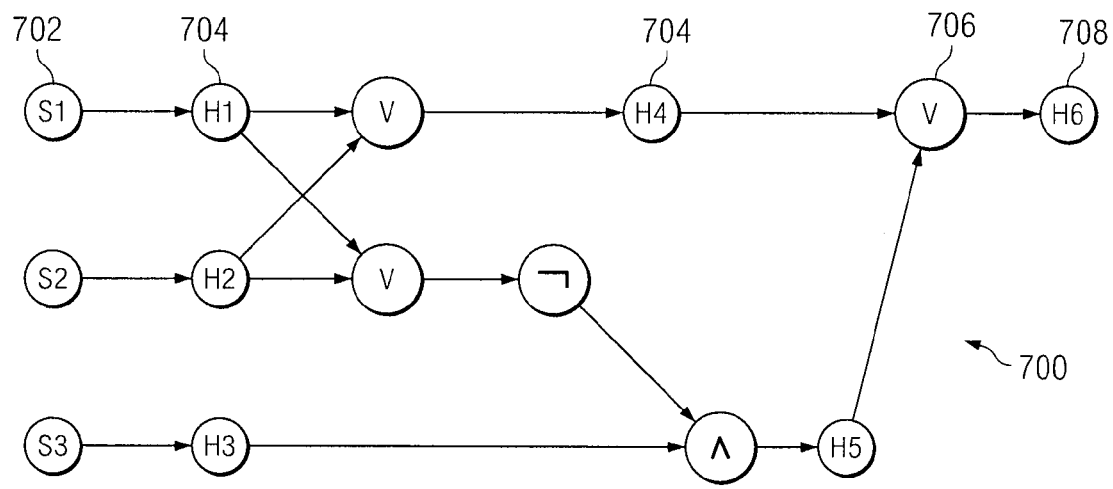
FIG. 7 illustrates an example processing of an electronic message according to analyzer heuristics using fuzzy logic.

FIG. 7 illustrates an example processing of an electronic message 18 according to analyzer heuristics 28 using fuzzy logic. This example involves a number of initial conditions, so outcomes of these conditions may affect each other before an ultimate classification probability is determined. FIG. 7 includes a model 700 of variables 702, intermediate set member values 704, fuzzy rules operations 706, and the resulting classification, or inference 708, regarding a problem with four input variables. In this example, the inference result is a probability that is a number [0, 100]. A threshold electronic message delivery classification may be defined based on the numerical value of the inference result.

In certain embodiments, the same heuristic may be used for an entire organization. For example, in a call center, all agents may perform a similar business function and would likely adhere to the same message prioritization process. In certain embodiments, business heuristic profiles may be defined by managers based on the business function of each employee. In certain embodiments, individual customization of heuristic profiles by employees may be allowed. The customization may be either manual (e.g., as a set of business rules) or automated (e.g., based on machine learning techniques). Any suitable combination of these embodiments is also contemplated by the present disclosure.

As described above, machine learning techniques include algorithms in the areas of artificial intelligence and statistics that estimate an unknown dependency between as system's inputs and outputs from the available sample data set. A generalization may be obtained from a set of samples and formalized into models.

Figure 8:
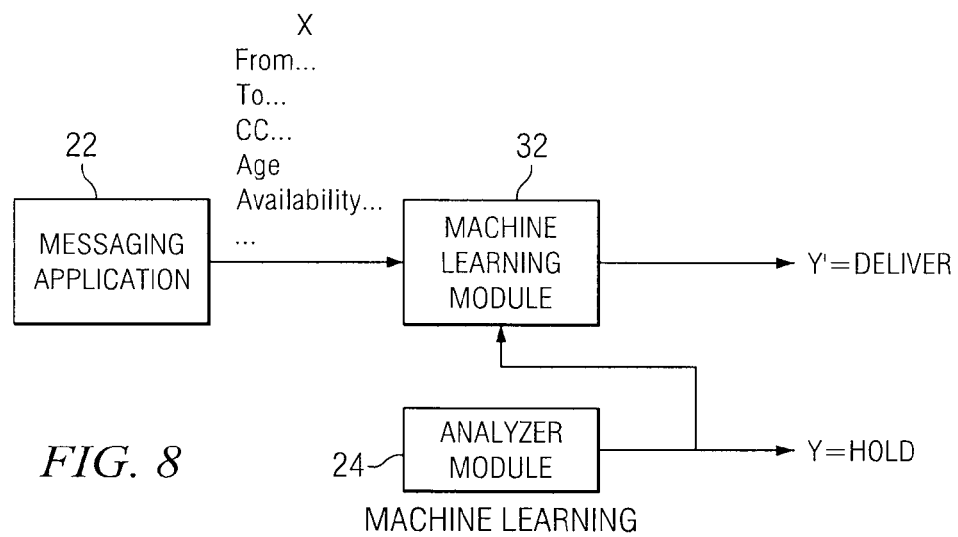
FIG. 8 illustrates an example scenario involving a machine learning module.

FIG. 8 illustrates an example scenario involving machine learning module 32. Messaging application 22 may provide a number of input vectors X. As illustrated in FIG. 8, these input vectors X may include From, To, CC, Age, Availability, and/or any other suitable vectors. Analyzer module 24 may return output Y for each random vector X. Machine learning module 32 may estimate an unknown input X'-to-output-Y' mapping based on the observed input-X-to-output-Y samples. In certain embodiments, this estimation may be performed using a set of functions that approximate the system's behavior. Typically, inductive learning systems use a pre-selected class of approximating functions $f(X, w)$, where X is an input and w is a parameter of a function. Approximating functions may be linear or non-linear.

There are two general types of learning methods, supervised and unsupervised. A supervised method assumes the existence of the training samples and a fitness evaluation mechanism, such as fitness function or other external method. The error may be defined as the difference between the desired output and the actual output of the learning system. The fitness function may evaluate the error and adjust the approximating function accordingly.

The input vector X may be defined as a collection of all appropriate business variables, such as calendar, priority, white lists, emergency calls, text analysis results and any other suitable variables. The output Y may be the message delivery priority ranking.

Unsupervised learning may be considered self-organized and may reduce or eliminate the external fitness evaluation mechanism. The most typical unsupervised task is clustering. Another common example is information retrieval. The system may detect whether an input vector X and the next input vector X' are close enough to be grouped together, based on a large number of inputs. The input vector X may consist of a random collection of some or all available business variables; and the next vector X' may consists of another random set of the same variables. After the clusters are automatically formed by the system, the user may review (label) the clusters and assign each a priority level. Once the cluster labeling is completed, the problem becomes substantially the same as supervised categorization, with the use of the initial clusters as a training data set.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for managing delivery of electronic messages, comprising:
   receiving an electronic message, the electronic message having an intended recipient and comprising content;
   analyzing the electronic message to determine a priority of the electronic message in relation to at least one other electronic message, wherein determining the priority comprises:
      computing a numeric priority value of the electronic message; and
      determining a priority level based on the computed numeric priority value, the priority of the electronic message comprising the priority level, wherein the priority level is one of a plurality of priority levels, each priority level associated with a corresponding range of numeric priority values;
   wherein determining the priority level of the electronic message comprises:
      determining a particular range of numeric priority values within which the computed priority value falls; and
      determining that the priority level of the electronic message comprises the priority level that corresponds to the particular range of numeric priority values;
   determining, based on the determined priority of the electronic message, whether to deliver the electronic message to the intended recipient at the current time;
   if it is determined, based on the determined priority of the electronic message, that the electronic message should be delivered to the intended recipient at the current time, initiating delivery of the electronic message to the intended recipient;
   receiving feedback from the intended recipient, the feedback comprising an indication of whether the electronic message should have been delivered in the manner in which the electronic message was delivered; and
   using one or more machine learning techniques to determine whether to generate update one or more analyzer heuristics for determining priority of future electronic messages.

2. The method of claim 1, wherein analyzing the electronic message to determine the priority of the electronic message comprises:
   accessing a set of analyzer heuristics comprising one or more analyzer heuristics; and
   analyzing the first electronic message based on the accessed set of analyzer heuristics to determine the priority of the electronic message.

3. The method of claim 2, wherein the one or more heuristics in the set of analyzer heuristics comprises one or more rules related to one or more of the following:
   a white list;
   a black list;
   a subject of the electronic message;
   a calendar of the intended recipient; and
   workplace semantics.

4. The method of claim 1, wherein analyzing the electronic message to determine the priority of the electronic message comprises using a machine learning mechanism to determine the priority of the electronic message.

5. The method of claim 1, wherein the determined priority comprises a numeric priority value.

6. The method of claim 1, comprising comparing the priority to a priority threshold to determine whether to send the electronic message.

7. The method of claim 1, comprising, if it is determined based on the determined priority of the electronic message that the electronic message should not be delivered to the intended recipient at the current time, initiating holding of the electronic message for delivery to the intended recipient at a later time.

8. The method of claim 7, further comprising, if it is determined that the electronic message should be held for delivery at a later time, reanalyzing the electronic message after the passage of a particular amount of time to determine whether to initiate delivery of the electronic message.

9. The method of claim 1, wherein the manner in which the electronic message was delivered comprises one or more of:
   whether the electronic message should have been delivered to the intended recipient; and
   whether the electronic message should have been delivered to the intended recipient at the time at which the electronic message was delivered.

10. The method of claim 1, wherein the electronic message comprises one or more of the following:
    an email message;
    an instant message (IM);
    a voice-over-Internet-Protocol (VoIP) message; and
    a text message.

11. A system for managing delivery of electronic communications, comprising:
    a memory device operable to store one or more analyzer heuristics; and
    one or more processing devices operable to:
       receive an electronic message, the electronic message having an intended recipient and comprising content;
       analyze the electronic message, based on one or more of the analyzer heuristics, to determine a priority of the electronic message in relation to at least one other electronic message, wherein when the processing device determines the priority, the processing device:
          computes a numeric priority value of the electronic message; and
          determines a priority level based on the computed numeric priority value, the priority of the electronic message comprising the priority level, wherein the priority level is one of a plurality of priority levels, each priority level associated with a corresponding range of numeric priority values;
       wherein when the processing device determines the priority level of the electronic message, the processing device:
          determines a particular range of numeric priority values within which the computed priority value falls; and
          determines that the priority level of the electronic message comprises the priority level that corresponds to the particular range of numeric priority values;
       determine, based on the determined priority of the electronic message, whether to deliver the electronic message to the intended recipient at the current time;
       if it is determined, based on the determined priority of the electronic message, that the electronic message should be delivered to the intended recipient at the current time, initiate delivery of the electronic message to the intended recipient;
       receive feedback from the intended recipient, the feedback comprising an indication of whether the electronic message should have been delivered in the manner in which the electronic message was delivered; and use one or more machine learning techniques to determine whether to generate update one or more analyzer heuristics for determining priority of future electronic messages.

12. The system of claim 11, wherein the one or more analyzer heuristics comprise one or more rules related to one or more of the following:
a white list;
a black list;
a subject of the electronic message;
a calendar of the intended recipient; and
workplace semantics.

13. The system of claim 11, wherein analyzing the electronic message to determine the priority of the electronic message comprises using a machine learning mechanism to determine the priority of the electronic message.

14. The system of claim 11, wherein the determined priority comprises a numeric priority value.

15. The system of claim 11, wherein the one or more processing units are operable to compare the priority to a priority threshold to determine whether to send the electronic message.

16. The system of claim 11, wherein one or more processing units are operable to, if it is determined based on the determined priority of the electronic message that the electronic message should not be delivered to the intended recipient at the current time, initiate holding of the electronic message for delivery to the intended recipient at a later time.

17. The system of claim 16, wherein the one or more processing units are further operable to, if it is determined that the electronic message should be held for delivery at a later time, reanalyze the electronic message after the passage of a particular amount of time to determine whether to initiate delivery of the electronic message.

18. The system of claim 11, wherein the manner in which the electronic message was delivered comprises one or more of:
whether the electronic message should have been delivered to the intended recipient; and
whether the electronic message should have been delivered to the intended recipient at the time at which the electronic message was delivered.

19. The system of claim 11, wherein the electronic message comprises one or more of the following:
an email message;
an instant message (IM);
a voice-over-Internet-Protocol (VoIP) message; and
a text message.

20. A non-transitory computer-readable medium containing instructions that, when executed by a processor, cause the processor to:
receive an electronic message, the electronic message having an intended recipient and comprising content;
analyze the electronic message to determine a priority of the electronic message in relation to at least one other electronic message, wherein when the processor determines the priority, the processor:
computes a numeric priority value of the electronic message; and
determines a priority level based on the computed numeric priority value, the priority of the electronic message comprising the priority level, wherein the priority level is one of a plurality of priority levels, each priority level associated with a corresponding range of numeric priority values;
wherein when the processor determines the priority level of the electronic message, the processor:
determines a particular range of numeric priority values within which the computed priority value falls; and
determines that the priority level of the electronic message comprises the priority level that corresponds to the particular range of numeric priority values;
determine, based on the determined priority of the electronic message, whether to deliver the electronic message to the intended recipient at the current time;
if it is determined, based on the determined priority of the electronic message, that the electronic message should be delivered to the intended recipient at the current time, initiate delivery of the electronic message to the intended recipient;
receive feedback from the intended recipient, the feedback comprising an indication of whether the electronic message should have been delivered in the manner in which the electronic message was delivered; and
use one or more machine learning techniques to determine whether to generate update one or more analyzer heuristics for determining priority of future electronic messages.

* * * * *